(12) United States Patent
Degler

(10) Patent No.: US 7,654,373 B2
(45) Date of Patent: Feb. 2, 2010

(54) TORQUE TRANSMISSION DEVICE

(75) Inventor: Mario Degler, Baden-Baden (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 405 days.

(21) Appl. No.: 11/516,160

(22) Filed: Sep. 6, 2006

(65) Prior Publication Data

US 2007/0056820 A1    Mar. 15, 2007

(30) Foreign Application Priority Data

Sep. 10, 2005    (DE) .................. 10 2005 043 148

(51) Int. Cl.
*F16H 45/02* (2006.01)
(52) U.S. Cl. ...................... 192/3.3; 192/3.29
(58) Field of Classification Search ............... None
See application file for complete search history.

(56) References Cited

U.S. PATENT DOCUMENTS 6,244,401 B1 *   6/2001   Maienschein et al. ........ 192/3.3
2004/0112698 A1 *   6/2004   Maienschein ............. 192/3.23

* cited by examiner

*Primary Examiner*—Rodney H Bonck
(74) *Attorney, Agent, or Firm*—Simpson & Simpson, PLLC

(57) ABSTRACT

The present invention relates to a torque transmission device in the drive train of a motor vehicle for torque transmission between a drive unit, in particular an internal combustion engine, a gearbox, and with a hydrodynamic torque converter. The torque converter lockup clutch comprises outer lamellae which work together with inner lamellae to connect to a driver plate which is connected to a torsional vibration damper. In order to provide a torque transmission device which has a long service life and can be produced economically, a coupling is fastened to the inner lamella carrier in such a manner that it cannot be turned, and to the radially inner edge area of the driver plate which bounds an annular space in which the radially inner edge area of the driver plate can be moved in the axial direction.

7 Claims, 2 Drawing Sheets

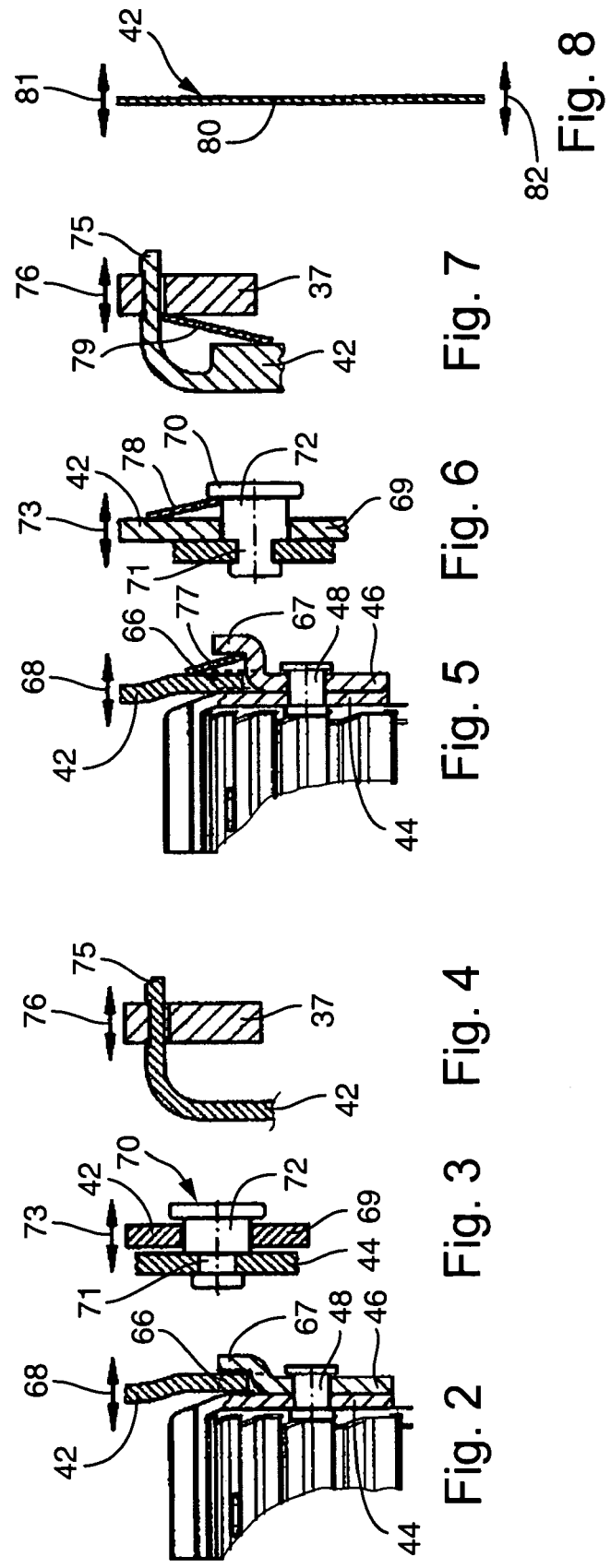

TORQUE TRANSMISSION DEVICE

CROSS REFERENCE TO RELATED APPLICATIONS

This patent application claims priority of German Patent Application No. 10 2005 043 148.8 filed Sep. 10, 2005, which application is incorporated herein by reference.

FIELD OF THE INVENTION

The present invention relates to a torque transmission device in the drive train of a motor vehicle for torque transmission between a drive unit and a gearbox, having a hydrodynamic torque converter which comprises a driving pump wheel, a driven turbine wheel, and a torque converter lockup clutch.

BRIEF SUMMARY OF THE INVENTION

In a preferred embodiment, the present invention comprises a torque transmission device wherein the coupling element has an area bent in the form of a step, extending radially outward as seen in cross section. The annular space is disposed between the inner lamella carrier and the coupling element's bent area is preferably formed by a coupling plate.

In a further preferred embodiment, the torque transmission device includes a step rivet fastened to the inner lamella carrier, the step rivet includes a fastening section with a small outer diameter and a bearing section with a large outer diameter whose length is greater than the thickness of a radially inner edge area of the driver plate which includes a through hole through which the bearing section extends. Preferably, the driver plate comprises on its radially inner area several through holes, which are distributed uniformly over the circumference of the radially inner edge area. A step rivet fastened to the inner lamella carrier is assigned to each of the through holes.

In a further preferred embodiment, the invention comprises a torque transmission device wherein, the driver plate is prebraced against the inner lamella carrier with the aid of a plate spring. Thereby, a definite positional alignment of the driver plate is ensured.

In a further preferred embodiment, the invention comprises a torque transmission device wherein the driver plate comprises at least one flexible intermediate area between a radially inner edge area and a radially outer edge area. The flexible intermediate area makes possible a movement of the radially inner edge area relative to the radially outer edge area of the driver plate in the axial direction and conversely.

In a further preferred embodiment, the invention comprises a torque transmission device wherein the driver plate comprises a coupling area bent at an angle extending radially outward. The coupling area connects, in such a manner that it cannot be turned but can be moved in the axial direction, to the input part of the torsional vibration damping device. The connection which is such that turning is impossible is, for example, made possible by coupling fingers, each of which has two stops between which the input part of the torsional vibration damping device can be moved back and forth in the axial direction.

In a further preferred embodiment, the invention comprises a torque transmission device including a plate spring preloaded in the axial direction which is disposed between the driver plate and the input part of the torsional vibration damping device. Thereby, a definite positional alignment of the driver plate or the input part of the torsional vibration damping device is ensured.

The object of the present invention is to provide a torque transmission device, by which the torque transmission device has a long service life and can be produced economically.

The object of the present invention is achieved in a torque transmission device in the drive train of a motor vehicle for torque transmission between a drive unit, in particular an internal combustion engine with a drive shaft, in particular a crankshaft, and a gearbox with at least one gearbox input shaft. In addition, the drive train includes a hydrodynamic torque converter which comprises a driving pump wheel, which is connected, via a housing and in such a manner that it cannot be turned, to the drive shaft of the drive unit, and a driven turbine wheel which is disposed, in such a manner that it can be turned, in the housing, and with a torque converter lockup clutch which can be actuated by a piston and comprises outer lamellae which work together with inner lamellae which are mounted on an inner lamella carrier which is connected, in a manner such that it cannot be turned, to a driver plate which in turn is connected, in a manner such that it cannot be turned, to an input part of a torsional vibration damping device.

The objective is realized by the inner lamella carrier coupling element which is connected, in such a manner that it cannot be turned, to the radially inner edge area of the driver plate and bounds an annular space in which the radially inner edge area of the driver plate can be moved in the axial direction. The coupling element can also be connected as one piece with the inner lamella carrier. The connection between the coupling element and the driver plate, the connection being fixed against turning, is preferably realized by an inner toothing on the driver plate which is in engagement with an outer toothing of the coupling element. Through the coupling element, axial forces occurring in the torque converter during driving are stayed in a simple manner. Thereby, undesirable plastic deformation of structural parts can be prevented. Furthermore, the undesirable friction caused by the axial forces can be minimized.

Further advantages, features, and details of the invention result from the following description, in which an exemplary embodiment is described in detail with reference to the drawing. The features cited in the claims and in the description may be significant to the present invention individually or in any arbitrary combination.

BRIEF DESCRIPTION OF THE DRAWINGS

The nature and mode of operation of the present invention will now be more fully described in the following detailed description of the invention taken with the accompanying drawing figures, in which:

FIG. 2 is an embodiment of axial forces occurring during driving that can be compensated with the present invention torque transmission device of FIG. 1;

FIG. 3 is a further embodiment of axial forces occurring during driving that can be compensated with the present invention torque transmission device of FIG. 1;

FIG. 4 is another embodiment of axial forces occurring during driving that can be compensated with the present invention torque transmission device of FIG. 1;

FIG. 5 is yet another embodiment of axial forces occurring during driving that can be compensated with the present invention torque transmission device of FIG. 1;

FIG. 6 is a further embodiment of axial forces occurring during driving that can be compensated with the present invention torque transmission device of FIG. 1;

FIG. 7 is another embodiment of axial forces occurring during driving that can be compensated with the present invention torque transmission device of FIG. 1; and, FIG. 8 is yet another embodiment of axial forces occurring during driving that can be compensated with the present invention torque transmission device of FIG. 1.

DETAILED DESCRIPTION OF THE INVENTION

Figure 1:
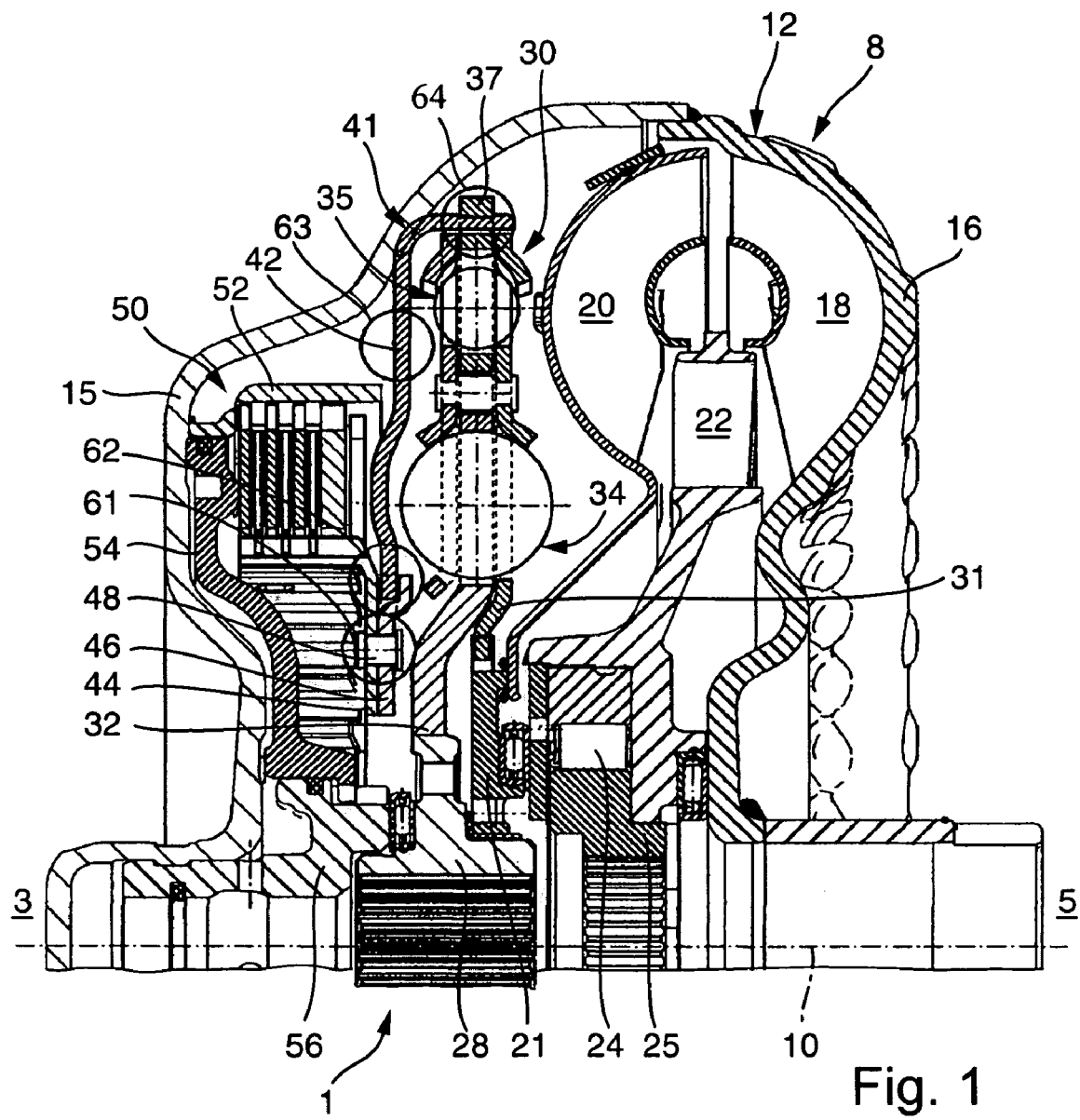
FIG. 1 is a torque transmission device in longitudinal section.

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the preferred embodiment.

Furthermore, it is understood that this invention is not limited to the particular methodology, materials, and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In FIG. 1 a part of drive train 1 of a motor vehicle is represented. Hydrodynamic torque converter 8 is disposed between drive unit 3, in particular an internal combustion engine from which a crankshaft goes out, and gearbox 5. Torque converter 8 is disposed so as to be concentric to axis of turning 10 and comprises housing 12 with housing wall 15 near to the drive and housing wall 16 far from the drive. Housing wall 15 is near drive unit 3, which is connected in such a manner that it cannot be turned. Housing wall 16 is far from drive unit 3, which is combined in one structural unit with pump wheel 18 of hydrodynamic torque converter 8.

Between pump wheel 18 and housing wall 15, turbine wheel 20 is disposed radially inwards to turbine wheel hub 21. Guide wheel 22 is disposed between turbine wheel 20 and pump wheel 18, which is guided via free wheel 24 on running wheel hub 25, which is disposed via a toothing on a tubular piece fixed relative to the housing.

Turbine wheel hub 21 is disposed, in a manner such that it can be turned, on torsional vibration damping device hub 28 of torsional vibration damping device 30. Torsional vibration damping device hub 28 is connected, in such a manner that it cannot be turned, to a gearbox input shaft (not represented). Radially outwards, turbine wheel hub 21 is connected, in such a manner that it cannot be turned, to first input part 31 of torsional vibration damping device 30. First input part 31 of torsional vibration damping device 30 is coupled in a known manner via energy storage elements 34, 35 with output part 32 of torsional vibration damping device 30. Output part 32 of torsional vibration damping device 30 is fastened radially inwards to torsional vibration damping device hub 28.

Output part 32 is coupled in a known manner via energy storage elements 34, 35 to second input part 37 of torsional vibration damping device 30. Second input part 37 of torsional vibration damping device 30 is formed in the manner of a flange and connected radially outwards to driver element 41. Driver element 41 is formed by driver plate 42 from which driver fingers go out radially, engage in corresponding recesses, and are hollowed out in second input part 37. Radially inwards, driver plate 42 is connected, with the aid of coupling element 46, in such a manner that it cannot be turned, to inner lamella carrier 44 of lamella coupling 50. Coupling element 46 is fastened with the aid of rivet connections 48 to inner lamella carrier 44. Inner lamella carrier 44 carries inner lamellae, which work together in a known manner with outer lamellae and are mounted on outer lamellae carrier 52. Outer lamellae carrier 52 is fastened to housing wall 15 of housing 12, the housing wall being the wall near to the drive. Lamella coupling 50 can be actuated by piston 54, which can be moved back and forth in the axial direction between housing wall 15 near to the drive and the lamellae of lamella coupling 50. Piston 54 is disposed, in a manner such that it can be turned, on hub part 56.

During driving, axial forces occur in hydrodynamic torque converter 8, which according to the present invention are compensated via individual components of torsional vibration damping device 30 or via driver element 41. Thereby, impermissible friction at these parts, as well as an undesirable plastic deformation of these parts, is prevented. The compensation of the axial forces can be accomplished by various measures, as is indicated by circles 61 through 64 which enclose the details which are represented on an enlarged scale in FIGS. 2 through 8.

In FIG. 2, details 61 and 62 from FIG. 1 are represented on an enlarged scale. Driver plate 42 is connected, at its radially inner edge area 66 and with the aid of coupling element 46, in such a manner that it cannot be turned, to inner lamella carrier 44. Coupling element 46 is formed by a metal plate, which comprises, radially outwards, area 67 bent in the form of a step. Area 67, bent in the form of a step, bounds an annular space in which radially inner edge area 66 of driver plate 42 is received, in such a manner that it can be moved back and forth in the axial direction, as is indicated by double arrow 68.

In FIG. 3, an additional embodiment example of detail 61 from FIG. 1 is represented. Driver plate 42 can also comprise radially inner edge area 69, which is fastened with the aid of step rivet 70 to inner lamella carrier 44. Step rivet 70 comprises fastening section 71 whose extension in the axial direction corresponds to the thickness of inner lamella carrier 44. Moreover, Step rivet 70 comprises bearing section 72 that has a greater outer diameter than fastening section 71. The extension of bearing section 72 in the axial direction is greater than the thickness of radially inner edge area 69 of driver plate 42. Thereby it is ensured that radially inner edge area 69 of driver plate 42 can be moved back and forth in the axial direction on bearing section 72, as is indicated by double arrow 73.

In FIG. 4, detail 64 from FIG. 1 is represented on an enlarged scale. Radially outwards, driver plate 42 has coupling area 75 bent at an angle. Coupling area 75 bent at an angle comprises a plurality of fingers which engage in recesses and are hollowed out radially outwards in second input part 37 of the torsional vibration damping device. The fingers, which are also designated as coupling fingers, each comprise, in the axial direction, two stops between which second input part 37 can be moved back and forth in the axial direction, as is indicated by double arrow 76.

The embodiment examples represented in FIGS. 2 through 4 have no definite positional alignment of the parts, and therefore can be moved relative to one another. In FIGS. 5 through 7, the embodiment examples of FIGS. 2 through 4 are provided with a definite positional alignment. In the embodiment example represented in FIG. 5, plate spring 77 is braced between radially inner edge area 66 of driver plate 42 and area 67, which is a part of coupling element 46 and is bent in the form of a step. In the embodiment example represented in FIG. 6, plate spring 78 is braced between step rivet 70 and radially inner edge area 69 of driver plate 42. In the embodiment example represented in FIG. 7, plate spring 79 is braced between second input part 37 and driver plate 42.

In FIG. 8, detail 63 of FIG. 1 is represented on an enlarged scale. In FIG. 8, driver plate 42 can have flexible intermediate area 80 between a radially inner edge area and a radially outer edge area, the intermediate area, as is indicated by double arrows 81 and 82, enabling movement of the radially inner edge area relative to the outer edge area of driver plate 42 in the axial direction and conversely.

Thus, it is seen that the objects of the present invention are efficiently obtained, although modification and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMBERS

1 Drive train
2 Drive unit
5 Gearbox
8 Hydrodynamic torque converter
10 Axis of turning
12 Housing
15 Housing wall near to the drive
16 Housing wall far from the drive
18 Pump wheel
20 Turbine wheel
21 Turbine wheel hub
22 Guide wheel
24 Free wheel
25 Running wheel hub
28 Torsional vibration damping device hub
30 Torsional vibration damping device
31 First input part
32 Output part
34 Energy storage element
35 Energy storage element
37 Second input part
41 Driver element
42 Driver plate
44 Inner lamella carrier
46 Coupling element
48 Rivet connection
50 Lamella coupling
52 Outer lamella carrier
54 Piston
56 Hub part
61 Detail
62 Detail
63 Detail
64 Detail
66 Radially inner edge area
67 Area bent in the form of a step
68 Double arrow
69 Radially inner edge area
70 Step rivet
71 Fastening section
72 Bearing section
73 Double arrow
75 Coupling area bent at an angle
76 Double arrow
77 Plate spring
78 Plate spring
79 Plate spring
80 Flexible intermediate area
81 Double arrow
82 Double arrow

What is claimed is:

1. A torque transmission device in a drive train (1) of a motor vehicle for torque transmission between an internal combustion engine (3) with a crankshaft, and a gearbox (5) with at least one gearbox input shaft, and with a hydrodynamic torque converter (8) which comprises a driving pump wheel (18), which is connected, via a housing (12), to the crankshaft of the internal combustion engine (3) such that the driving pump wheel and combustion engine are rotationally fixed relative to one another, and a driven turbine wheel (20) which is disposed in the housing (12) such that the turbine wheel is rotatable, and with a torque converter lockup clutch (50) which can be actuated by a piston (54) and comprises outer lamella carrier (52) inner lamella carrier (44), driver plate (42) with radially inner edge (66), and coupling element (46), wherein the inner lamella carrier (44) is fixedly secured to the coupling element (46), wherein the driver plate (42) is secured to the inner lamellae carrier (44) such that the driver plate (42) and the inner lamellae carrier (44) are rotationally fixed relative to one another, wherein the driver plate (42) is fixedly connected to an input part (37) of a torsional damping device (30), wherein the inner lamellae carrier (44) and the coupling element (46) form an annular space, wherein the radially inner edge (66) is disposed in the annular space, and wherein the radially inner edge (66) is axially displaceable with respect to the inner lamellae carrier (44) and the coupling element (46).

2. The torque transmission device according to claim 1, wherein the coupling element (46) comprises, radially outwards as seen in cross section, an area (67) bent in the form of a step.

3. The torque transmission device according to claim 1, wherein a step rivet (70) is fastened to the inner lamella carrier and wherein the step rivet (70) comprises a fastening section (71) with a small outer diameter and a bearing section (72) with a large outer diameter whose length is greater than the thickness of a radially inner edge area (69) of the driver plate (42) which has a through hole through which the bearing section (72) extends.

4. The torque transmission device according to claim 1, wherein the driver plate (42) is pre-braced against the inner lamella carrier (44) with the aid of a plate spring (77, 78).

5. The torque transmission device according to claim 1, wherein the driver plate (42) comprises at least one flexible intermediate area (80) between a radially inner edge area and a radially outer edge area.

6. The torque transmission device according to claim 1, wherein the driver plate (42) comprises, radially outwards, a coupling area (75) bent at an angle, said coupling area being connected, in such a manner that it cannot be turned but can be moved in the axial direction, to the input part (37) of the torsional vibration damping device (30).

7. The torque transmission device according to claim 6, wherein a plate spring (79) is pre-loaded in the axial direction and is disposed between the driver plate (42) and the input part (37) of the torsional vibration damping device (30).

* * * * *